United States Patent [19]

Rosen

[11] Patent Number: 4,605,373

[45] Date of Patent: Aug. 12, 1986

[54] TRAINING DEVICE FOR SETTING BROKEN LIMBS

[76] Inventor: Bernard A. Rosen, 4246 Atlantic Ct., Santa Clara, Calif. 95054

[21] Appl. No.: 690,466

[22] Filed: Jan. 10, 1985

[51] Int. Cl.⁴ ............................................. G09B 23/32
[52] U.S. Cl. ...................................................... 434/274
[58] Field of Search .............. 434/265, 267, 274, 275; 73/432 R, 432 SD

[56] References Cited

U.S. PATENT DOCUMENTS

| | | | |
|---|---|---|---|
| 3,209,469 | 10/1965 | James | 434/265 |
| 3,276,147 | 10/1966 | Padellford | 434/265 |
| 3,736,362 | 5/1973 | Laerdal | 434/265 |
| 3,771,359 | 11/1973 | Shoberg | 73/862.04 |
| 3,895,451 | 7/1975 | Smrcka | 434/274 |
| 4,349,339 | 9/1982 | Daniel | 434/274 |
| 4,350,490 | 9/1982 | Sandegård | 434/274 |
| 4,360,345 | 11/1982 | Hon | 434/265 X |
| 4,488,433 | 12/1984 | Denton | 434/274 X |

*Primary Examiner*—Harland S. Skogquist
*Attorney, Agent, or Firm*—Julian Caplan

[57] ABSTRACT

An artificial limb (e.g., leg) is provided with rigid members simulating the lower and upper halves of the lower leg, the knee joint and the upper leg. At each joint is a sensor-potentiometer similar to the joy-stick of a computer game arranged so that relative movement of rigid members cause movement of the joy-stick. Leads from the outputs of the sensors are connected to an analog-to-digital converter connected to a personal computer. In teaching first aid for fractured limbs, the student is taught to apply splints and move the patient to a stretcher with as little relative movement as possible. The training device indicates relative movement. The screen may display positions of the rigid members in two planes and/or numerical tallies.

6 Claims, 3 Drawing Figures

TRAINING DEVICE FOR SETTING BROKEN LIMBS

BACKGROUND OF THE INVENTION

This invention relates to a new and improved training device for setting broken limbs. Sensors are placed in a prosthesis used for medical training with an internal skeleton implanted in the prosthesis and connected to the sensors. Output voltage from the sensors is fed to an analog-to-digital conversion board of a personal computer. The computer translates the output from the sensors to display graphics and numerical tallies indicating performance of trainees in first aid practice.

DESCRIPTION OF PRIOR ART

U.S. Pat. No. 4,350,490 discloses a signalling device to indicate correct and incorrect relative locations of two body portions, such as two ends of a broken bone. However, the signal does not indicate how far apart the trainee moves the bone sections, or the relative movement, nor is a display provided.

U.S. Pat. No. 1,581,736 discloses a demonstration device showing or illustrating the effect of adjustments of the human spine for use by chiropractors in explaining procedures to patients. Manipulation of the vertebrae controls signals which simulate the effect of spinal adjustments upon organs of the body. This patent does not have the advantages of applicant's invention as hereinafter appears.

OBJECTS AND SUMMARY OF THE INVENTION

An artificial or manikin-type limb with an internal skeleton implanted with sensors is provided. The sensors are electronic potentiometers which provide a varying voltage based upon movement of the limb. The output voltage from the potentiometers is fed to an analog-to-digital conversion board inserted into a personal computer. Software of the computer translates the output from the analog-to-digital conversion board to display graphics, numeric tallies or a simple alarm indicating over-movement of the limb.

A "skeleton" is imbedded in the prosthesis. Joy-stick potentiometers, such as those used in computer games are installed in the joints between the skeleton sections. Thus, such sensors may be located at the top of the thigh, two places at the knee and a location one-half the distance between the knee and the ankle as a typical example. It will be understood that other limbs and other placements of sensors are contemplated. Movement of the thigh, knee and lower leg are sensed and the potentiometers connected to the sensors control the output information heretofore described.

The device finds its principal usefulness in the testing and training of persons involved in first-aid, emergency medical treatment, nursing and the like. Such training involves examination of the patient and treatment of fractured extremeties, including bones and joints. Such testing and training has heretofore been primarily subjective—i.e., the tester and trainer observe the action of the trainee and record whether or not the movement of the affected part is acceptable or not.

The present invention displays the amount of movement of the limb and its parts and thus removes the subjective measurement. The device accurately measures the exact amount of movement of the limb and indicates to the computer the type of exercise being performed (i.e., either an injured knee exercise or a fracture of the lower leg). Scoring of the trainee is accomplished.

A graphic display may be provided showing the leg as it is being moved. Two displays may be combined on the screen of the computer, one showing lateral movement and one showing posterior-anterior movement. A slight amount of such movement of the injured part is acceptable. Hence, the trainer may select values for the acceptable range. The computer recognizes when the bounds of the range have been exceeded and an audible signal may be generated.

Preferably, two types of movement are recorded for analysis. First, the total amount of movement in each plane for each affected part is recorded. Secondly, final displacement in each direction for each affected part is recorded. Both data are important in analyzing the trainee's efforts. When preparing an injured limb for transport, the basic objective is to splint the injured part to prevent movement and thus prevent further damage. To be effective, there must be a minimum over-all movement. Final position of the limb must be close to where it began. For example, for a knee injury, horizontal (left to right) movement is very undesirable, even if the final position of the knee is back at its initial position.

When trainees have completed their exercises, a listing of each exercise showing the accumulated data and the overall range of performances is provided.

As an alternate to the computer display and printout heretofore described, a simplified monitoring device may be provided, using two light bar indicators which show movement as it occurs. This simplified approach does not retain data as in the preceding modification, but does show movement as it occurs. Audible signals may be used to indicate when preset ranges of movement have been exceeded.

Other objects of the present invention will become apparent upon reading the following specification and referring to the accompanying drawings in which similar characters of reference represent corresponding parts in each of the several views.

DETAILED DESCRIPTION OF A PREFERRED EMBODIMENT

The invention will be described with specific reference to the limb shown in FIG. 1, which is a prosthesis 11 of sponge rubber, or the like, in which is imbedded a skeleton. It will be understood that the device is useful in other limbs simulating limbs of the human body and that the number of joints hereinafter described is subject to considerable variation.

Figure 1:
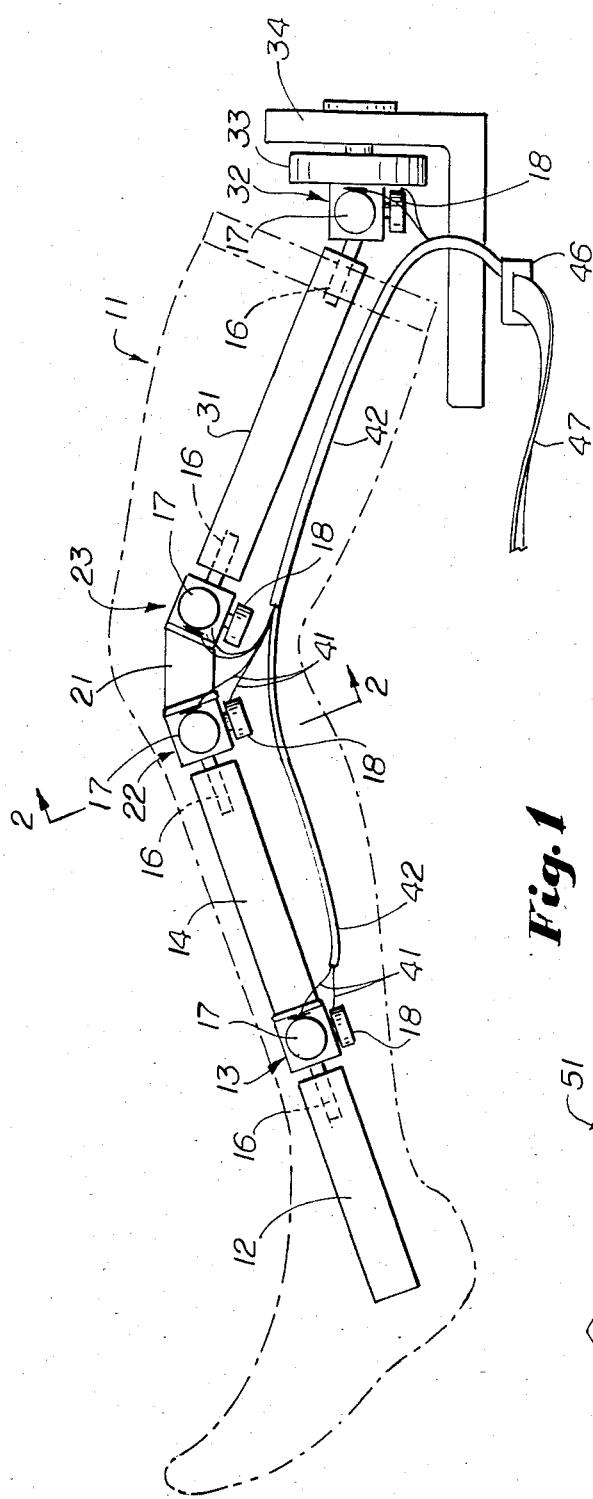
FIG. 1 is a schematic side elevational view showing the skeleton imbedded in a prosthesis.
Figure 2:
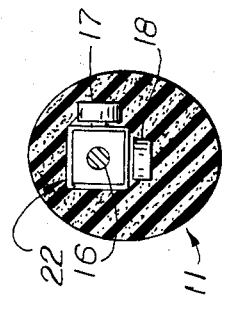
FIG. 2 is a sectional view taken substantially along the line 2—2 of FIG. 1.
Figure 3:
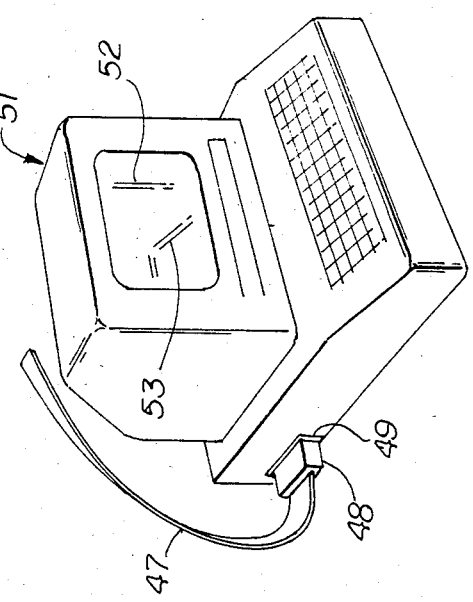
FIG. 3 is a schematic diagram showing connection of the various sensors to a personal computer.

As shown in FIG. 1, there is provided a skeleton member 12 representing the lower half of a tibia. The member 12 may be a 1"×1" piece of wood or plastic or other suitable representation of one-half of a fractured tibia. Above the lower half 12 is a sensor 13 representing a joint and above the sensor 13 is an upper half of the tibia 14. The upper half 14, as well as other sections of the limb, may resemble that of part 12. The sensor 13 is fixed to the lower end of the upper half 14. Sensor 13 is similar to the "joy-stick" of a computer game. Thus it has a projection 16 imbedded in the upper end of portion 12 which resembles the joy-stick. Movement of this stick 16 affects the output of two potentiometers 17 and 18 which are at 90° angles with respect to each other. Thus, if the member 12 moves relative to the member 14 in either of two directions, the output of potentiometers 17 and/or 18 is affected.

A knee 21 is provided having fixed at either end thereof at 45° angles, sensors 22 and 23 which resemble sensor 13. The stick 16 of sensor 22 is imbedded in the upper end of member 14 while the stick 16 of member 23 is imbedded in the lower end of thigh member 31. Any movement of knee 21 relative to members 14 and 31 results in affecting the output of potentiometers 17 and 18 of the sensors 22 or 23.

Sensor 32 above thigh 31 is fixed to a terminus 33 mounted in a support frame 34. The stick 16 of sensor 32 is imbedded in the upper end of thigh 31.

For each of the sensors 13, 22, 23 and 32, there are preferably four leads 41, namely, a power lead, a ground lead, and two control/sense leads. These leads 41 are received in a ten conductor cable 42. At an appropriate location, the cable 42 is plugged to a 10 to 16 connector junction 46 which is, in turn, connected to a ribbon conductor 47 leading to a plug 48. The plug 48 is attached to the analog-to-digital conversion board 49 which is actually a part of the computer 51 but, for the purpose of clarity, the board 49 is not shown installed in computer 51.

The computer 51 may have a lateral display 52 and a posterior anterior display 53, both displayed simultaneously on its conventional screen. There also may be a printer (not shown) of conventional type connected to the computer 51 which may provide numerical tallies showing the extent of movement of each of the sensors.

By way of specification, but without intending thereby to be limited to the particular specifications:

The potentiometers are of a type made for Tandy Corporation (Radio Shack, Part No. 271-1706). The joy-stick had dual 40,000 ohm linear potentiometer.

Converter 49 may be a board manufactured by John Bell Engineering, Inc., Part. No. 81-132. Computer 51 may be an Apple IIe computer.

What is claimed is:

1. A training device for first aid handling of broken limbs comprising a flexible simulation of a limb having at least first and second substantially rigid, bone-simulating members embedded within said simulation in proximity to each other, a sensor fixed to the end of said first member nearest said second member, said sensor having a projection embedded in an end of said second member and a first and a second potentiometer at 90° angles with respect to each other capable of emitting an electric signal responsive to relative movement of said projection relative to said sensor in either of two directions, and an electric circuit including said first and second potentiometers and having means indicating to an observer that said potentiometers have been actuated by said projection.

2. A device according to claim 1 in which said electric circuit further includes an analog to digital conversion board and said means is a computer having a visual display depicting the angle and extent of said relative movement.

3. A device according to claim 1 in which said electric circuit includes a computer having a printer to print out indicia of the extent of said relative movement.

4. A device according to claim 1 in which said means is an alarm and a control for said alarm whereby said alarm is actuated when said relative movement exceeds a preselected amount.

5. A device according to claim 1 in which said first and second members correspond to the lower half and the upper half of the tibia and which further comprises a third member corresponding to the knee, a fourth member corresponding to the thigh, and which also comprises a second sensor fixed to said knee, said second sensor having a second projection embedded in an end of said first member, and a third and fourth potentiometer at 90° angles with respect to each other capable of emitting an electric signal responsive to relative movement of said second projection relative to said second sensor in either of two directions, a third sensor having a third projection embedded in the lower end of the thigh and a fifth and sixth potentiometer at 90° angles with respect to each other capable of emitting an electric signal responsive to relative movement of said third projection relative to said third sensor in either of two directions, said electric circuit including said third, fourth, fifth and sixth potentiometers, said means indicating to an observer relative movement of said knee relative to said second member and also relative to said thigh in either of two planes.

6. A device according to claim 5 which further comprises a terminus at the upper end of said simulator, a fourth sensor fixed to said terminus having a fourth projection embedded in the upper end of said thigh and seventh and eighth potentiometers at 90° angles with respect to each other capable of emitting an electric signal responsive to relative movement of said fourth projection relative to said third sensor in either of two directions, said electric circuit including said seventh and eighth potentiometers, said means indicating to an observer relative movement of said thigh relative to said terminus in either of two planes.

* * * * *